Figure 1:
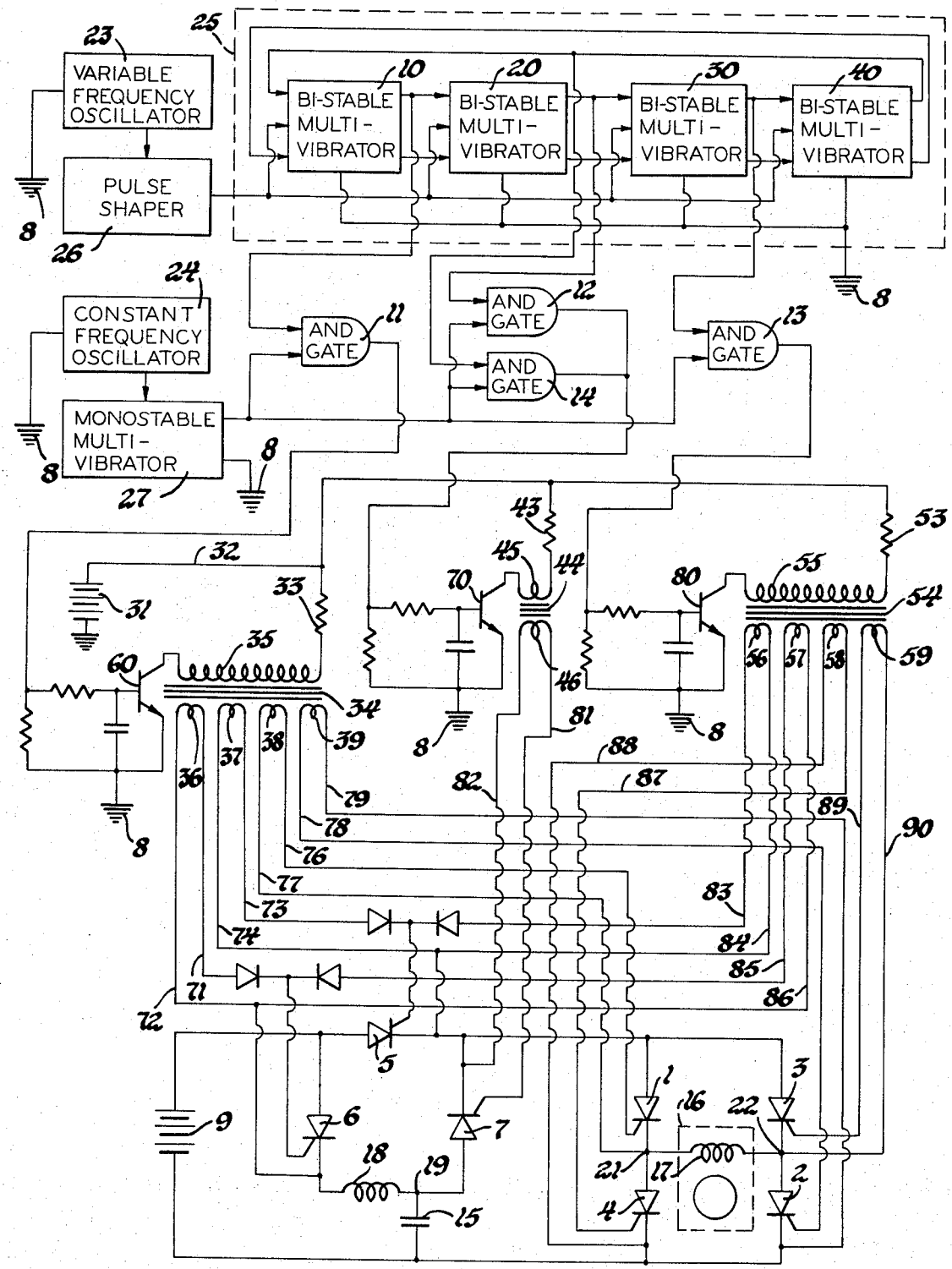

United States Patent

Miller

[15] 3,694,714

[45] Sept. 26, 1972

[54] SINGLE PHASE INVERTER CONTROL CIRCUIT

[72] Inventor: Michael B. Miller, Bellbrook, Ohio

[73] Assignee: General Motors Corporation, Detroit, Mich.

[22] Filed: Sept. 28, 1971

[21] Appl. No.: 184,353

[52] U.S. Cl. ................318/138, 318/227, 318/231, 321/45
[51] Int. Cl. ............................................H02k 29/00
[58] Field of Search .........318/138, 227, 231; 321/45

[56] References Cited

UNITED STATES PATENTS

| | | | |
|---|---|---|---|
| 3,560,817 | 2/1971 | Amato | 318/138 |
| 3,603,866 | 9/1971 | Opal | 318/138 |

*Primary Examiner*—Gene Z. Rubinson
*Attorney*—Eugene W. Christen et al.

[57] ABSTRACT

A four-stage shift register, responsive to the output signals of a variable frequency oscillator, produces a discrete square wave output signal during each of four time periods, each of which is applied to a corresponding AND gate. The output signals of a constant frequency oscillator are applied to all of the AND gates in parallel. The output signals of the AND gate corresponding to the first time period are applied across the gate-cathode electrodes of the two inverter silicon controlled rectifiers through which energizing current may be supplied to the motor in a first direction from a direct current potential source, a power silicon controlled rectifier switch through which the source of direct current operating potential is applied across the inverter circuit and a capacitor charge circuit silicon controlled rectifier through which an extinguishing capacitor is charged across the source of direct current operating potential, the output signals of the AND gates corresponding to the second and fourth time periods are applied across the gate-cathode electrodes of an extinguishing silicon controlled rectifier through which the charge upon the extinguishing capacitor is applied across the anode-cathode electrodes of the power silicon controlled rectifier switch in an inverse polarity relationship and the output signals of the AND gate corresponding to the third time period are applied across the gate-cathode electrodes of the other two inverter silicon controlled rectifiers through which energizing current may be supplied to the motor in a second opposite direction, the power silicon controlled rectifier switch and the capacitor charge circuit silicon controlled rectifier.

3 Claims, 2 Drawing Figures

United States Patent
Miller
3,694,714
Sept. 26, 1972
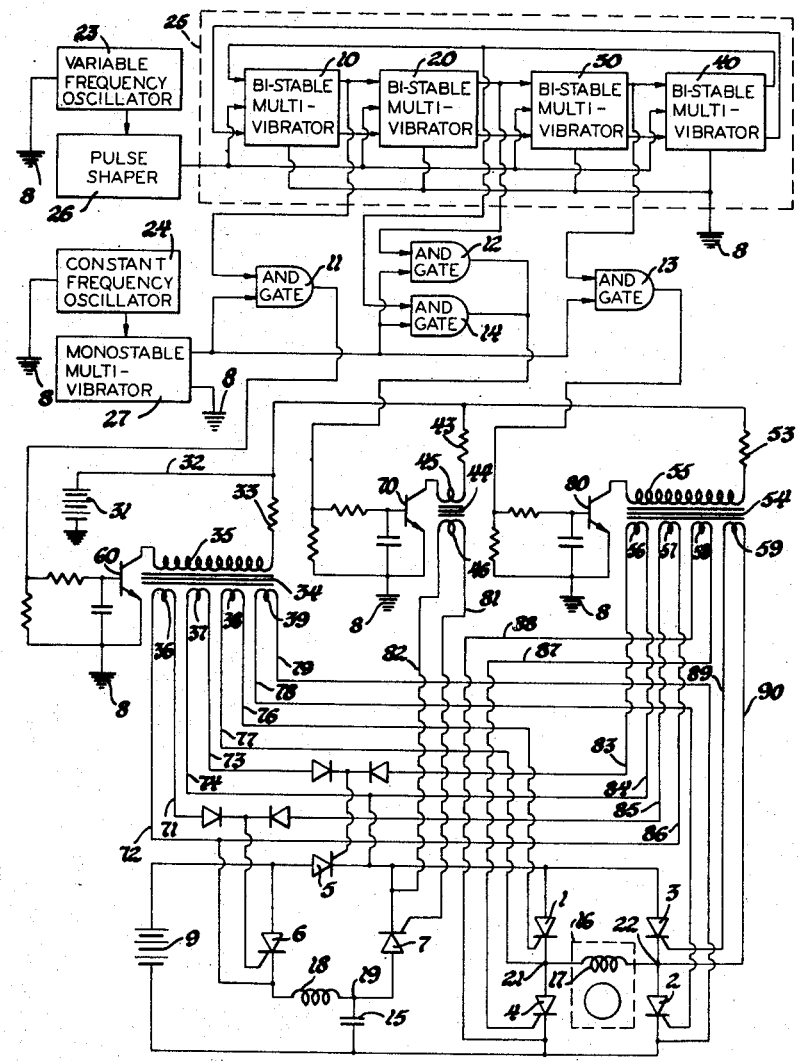

SINGLE PHASE INVERTER CONTROL CIRCUIT

This invention is directed to a single phase inverter control circuit and, more specifically, to a single phase inverter control circuit which supplies a series of electrical trigger signals across the gate-cathode electrodes of the silicon controlled rectifiers of the single phase inverter during the time periods during which they are to be triggered conductive to provide for the energization of a single phase alternating current motor from a source of direct current operating potential.

There are two basic methods of isolating the gate-cathode circuits of the silicon controlled rectifiers of an inverter circuit configuration. One method is to employ isolated trigger circuits, each of which has its own power supply, connected directly across the gate-cathode electrodes of each inverter silicon controlled rectifier. However, this method is rather cumbersome and requires a multiplicity of separate gate circuit power supplies. Another method is to connect the gate-cathode circuit of each of the inverter silicon controlled rectifiers to a single gate-cathode power supply through respective pulse transformers. However, this method also has a disadvantage in that it is difficult to obtain a sufficient pulse width with the proper rise time to maintain the inverter silicon controlled rectifiers conductive into an inductive circuit throughout the conduction period. To eliminate this disadvantage, a constant frequency oscillator may be employed to supply a series of pulses across the gate-cathode electrodes of each of the silicon controlled rectifiers of the inverter circuit for the entire conduction period.

It is, therefore, an object of this invention to provide an improved single phase inverter control circuit.

It is another object of this invention to provide an improved single phase inverter control circuit wherein a series of trigger signal pulses are applied across the gate-cathode electrodes of the silicon controlled rectifiers of a single phase inverter circuit during the entire conduction period.

In accordance with this invention, a single phase inverter control circuit is provided wherein a square wave signal corresponding to each of four time periods is produced in response to a variable frequency oscillator and the output signals of a constant frequency oscillator are gated therewith to provide a series of trigger signal pulses during each time period which are applied across the gate-cathode electrodes of the silicon controlled rectifiers of an inverter circuit through which a single phase alternating current motor is energized from a source of direct current operating potential.

Figure 2:
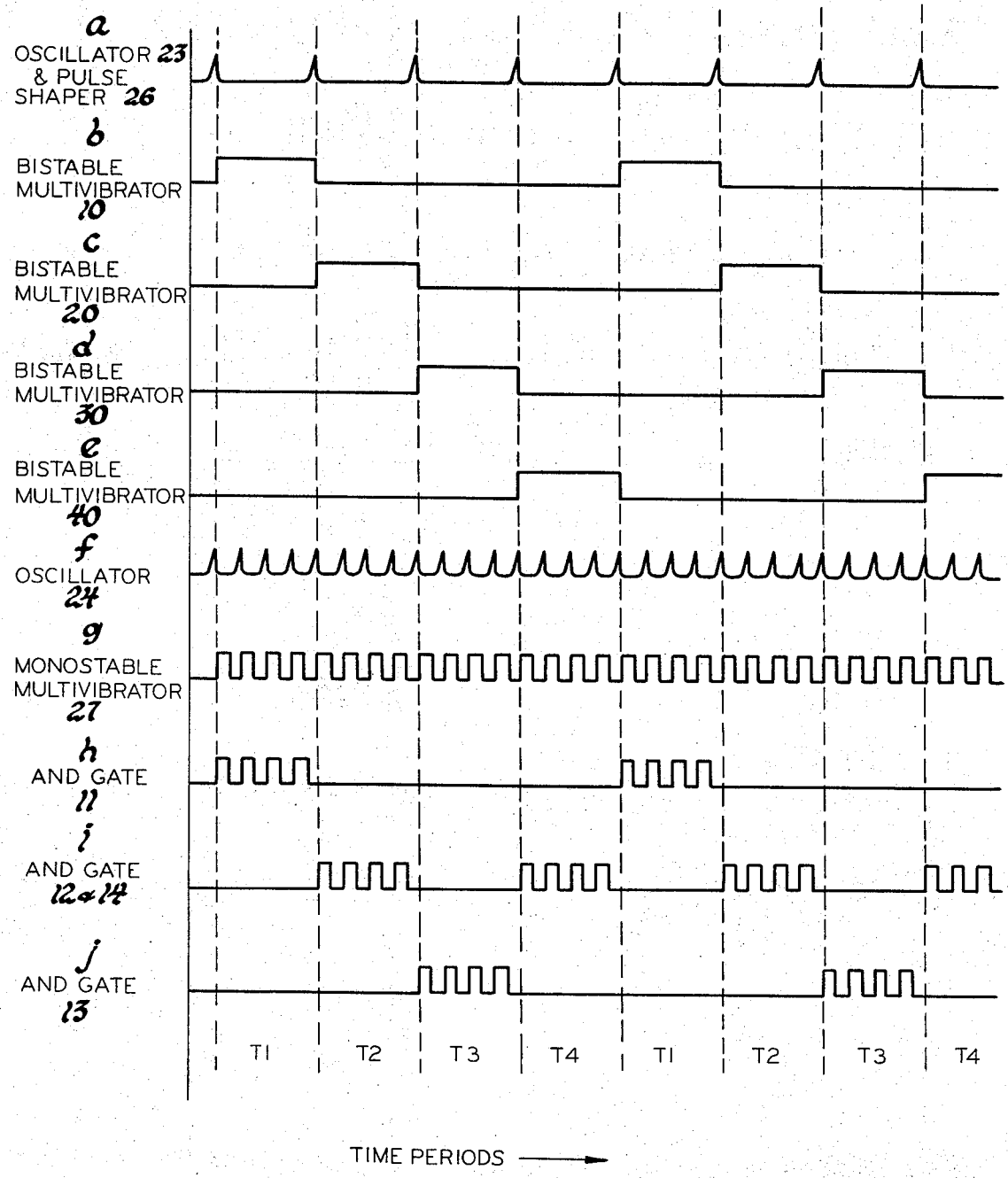

For a better understanding of the present invention, together with additional objects, advantages and features thereof, reference is made to the following description and accompanying drawings in which:

FIG. 1 sets forth the single phase inverter control circuit of this invention in schematic form, and FIG. 2 is a set of curves useful in understanding the single phase inverter control circuit of FIG. 1.

As point of reference or ground potential is the same point electrically throughout the system, it has been represented in FIG. 1 by the accepted schematic symbol and referenced by the numeral 8.

Referring to FIG. 1 of the drawing, the single phase inverter control circuit of this invention is set forth in schematic form in combination with a single phase alternating current motor 16 energized from a source of direct current operating potential, which may be a battery 9, through a single phase inverter circuit having four inverter silicon controlled rectifiers 1, 2, 3, and 4, each having gate, anode and cathode electrodes, connected in a bridge configuration, a power silicon controlled rectifier switch 5 having a gate electrode and anode-cathode electrodes connected in series between the source of direct current operating potential 9 and the inverter circuit, a capacitor charge circuit silicon controlled rectifier 6 having a gate electrode and anode-cathode electrodes connected in series with an extinguishing capacitor 15 across the source of direct current operating potential 9 and an extinguishing silicon controlled rectifier 7 having a gate electrode and anode-cathode electrodes through which the charge upon the extinguishing capacitor 15 may be applied across the anode-cathode electrodes of the power silicon controlled rectifier switch 5 in an inverse polarity relationship and includes a variable frequency oscillator 23, means responsive to the electrical signals produced by the variable frequency oscillator 23 for producing a discrete square wave output signal during each of four time periods, may be a conventional shift register circuit 25, a constant frequency oscillator 24 and a gate circuit having input and output circuit means corresponding to each of the time periods, may be respective two-input AND-gates 11, 12, 13, and 14.

The shift register circuit 25 may be made up of four bistable multivibrator circuits 10, 20, 30 and 40 interconnected as shown in FIG. 1. As these bistable multivibrator circuits may be any of the several well known in the art and are commercially available items, each has been illustrated in FIG. 1 in block form. One example of a bistable multivibrator circuit suitable for use in this invention is commercially available from Motorola Semiconductor Products, Inc., type MC–846 P.

The output signals of variable frequency oscillator 23 may be shaped in the form of a series of positive polarity potential spikes, as shown in FIG. 2a, by a conventional pulse shaper 26 which, since it may be any one of the many conventional pulse shapers well known in the art has been indicated in FIG. 1 in block form.

The shift register circuit 25 is responsive to the electrical signals produced by variable frequency oscillator 23 to produce a discrete square wave output signal during each of four time periods. That is, bistable multivibrator circuit 10 produces a square wave output signal during the first time period T1, bistable multivibrator circuit 20 produces a square wave output signal during the second time period T2, bistable multivibrator circuit 30 produces a square wave output signal during the third time period T3 and bistable multivibrator circuit 40 produces a square wave output signal during the fourth time period T4, as shown by the respective curves of FIGS. 2b, 2c, 2d, and 2e. At the conclusion of the fourth time period T4, bistable multivibrator 10 is responsive to the next output signal of variable frequency oscillator 23 to produce a square wave output signal during time period T1.

The output signals produced by constant frequency oscillator 24, illustrated by curve 2f, may be stretched, if desirable, by a conventional monostable multivibrator 27 which, since it may be any one of the many monostable multivibrators well known in the art has been illustrated in FIG. 1 in block form. The output signals of monostable multivibrator 27 are illustrated in FIG. 2g and are applied to one of the input circuit terminals of each of AND-gates 11, 12, 13, and 14 in parallel, as illustrated in FIG. 1.

The square wave output signal produced by shift register 25 during each time period is applied to the corresponding one of the gate circuits 11, 12, 13, and 14. That is, the square wave output signals produced by bistable multivibrator 10 are applied to the other input circuit terminal of AND-gate 11 which corresponds to the first time period T1, the square wave output signals produced by bistable multivibrator circuit 20 are applied to the other input circuit terminal of AND-gate circuit 12 which corresponds to the second time period T2, the square wave output signals produced by bistable multivibrator circuit 30 are applied to the other input circuit terminal of AND-gate 13 which corresponds to the third time period T3 and the square wave output signals produced by bistable multivibrator circuit 40 are applied to the other input circuit terminal of AND-gate 14 which corresponds to the fourth time period T4, as shown in FIG. 1.

Referring to FIG. 2, during the first time period T1, the square wave output signal produced by bistable multivibrator circuit 10 and the output signals of constant frequency oscillator 24 are applied to respective input circuit terminals of two-input AND-gate 11; during the second time period T2, the square wave output signals produced by bistable multivibrator circuit 20 and the output signals of constant frequency oscillator 24 are applied to respective input circuit terminals of two-input AND-gate 14; during the third time period T3, the square wave output signal produced by bistable multivibrator circuit 30 and the output signals of constant frequency oscillator circuit 24 are applied to respective input circuit terminals of two-input AND-gate 13 and during time period T4, the square wave output signal produced by bistable multivibrator circuit 40 and the output signals of constant frequency oscillator 24 are applied to respective input circuit terminals of two-input AND gate 13. Consequently, during each of the four timer periods, respective two-input AND-gates 11, 12, 13, and 14 produce a series of output signals for the duration of the time period of a frequency equal to the frequency of the output signals of constant frequency oscillator 24 as shown in FIGS. 2h, 2i, and 2j.

If desirable, two-input NAND gates may be used as gate circuits 11, 12, 13, and 14 without departing from the spirit of the invention.

With many applications, the output signals produced by the AND gates may be of an insufficient magnitude to trigger the silicon controlled rectifiers of the inverter circuit conductive. Consequently, the output signals produced by AND-gate 11 may be amplified by a conventional transistor 60 amplifier circuit, the output signals produced by AND-gates 12 and 14 may be amplified by a conventional transistor 70 amplifier circuit and the output signals produced by AND-gate 13 may be amplified by a conventional transistor 80 amplifier circuit.

Each output signal of AND-gate 11 is of the proper polarity to produce base-emitter current flow and, consequently, collector-emitter current flow through type NPN-transistor 60, each output signal of AND-gates 12 and 14 is of the proper polarity to produce base-emitter and, consequently, collector-emitter current flow through type NPN-transistor 70 and each output signal of AND-gate 13 is of the proper polarity to produce base-emitter and, consequently, collector-emitter current flow through type NPN-transistor 80.

While type NPN-transistor 60 is conducting through the collector-emitter electrodes, energizing current flows through primary winding 35 of transformer 34 through a circuit which may be traced from the positive polarity terminal of battery 31, through lead 32, current limiting resistor 33, primary winding 35, the collector-emitter electrodes of transistor 60 and point of reference or ground potential 8 to the negative polarity terminal of battery 31. While type NPN transistor 70 is conducting through the collector-emitter electrodes, energizing current flows through primary winding 45 of transformer 44 through a circuit which may be traced from the positive terminal of battery 31, through lead 32, current limiting resistor 43, primary winding 45, the collector-emitter electrodes of transistor 70 and point of reference or ground potential 8 to the negative polarity terminal of battery 31. While type NPN transistor 80 is conducting through the collector-emitter electrodes, energizing current flows through primary winding 55 of transformer 54 through a circuit which may be traced from the positive polarity terminal of battery 31, through lead 32, current limiting resistor 53, primary winding 55, the collector-emitter electrodes of transistor 80 and point of reference or ground potential 8 to the negative polarity terminal of battery 31.

The output signals of AND-gate 11, which corresponds to the first time period, are applied across the gate-cathode electrodes of capacitor charge circuit silicon controlled rectifier 6, power silicon controlled rectifier switch 5 and the two inverter silicon controlled rectifiers 1 and 2 through which energizing current may be supplied to motor 16 in a first direction.

Magnetically coupled to primary winding 35 of pulse transformer 34 are four secondary windings 36, 37, 38, and 39. Secondary winding 36 is connected across the gate-cathode electrodes of capacitor charge circuit silicon controlled rectifier 6 through respective leads 71 and 72, secondary winding 37 is connected across the gate-cathode electrodes of power silicon controlled rectifier switch 5 through respective leads 73 and 74, secondary winding 38 is connected across the gate-cathode electrodes of inverter silicon controlled rectifier 1 through respective leads 76 and 77 and secondary winding 39 is connected across the gate-cathode electrodes of inverter silicon controlled rectifier 2 through respective leads 78 and 79.

The output signals of AND-gates 12 and 14, which correspond to the second and fourth time periods, are applied across the gate-cathode electrodes of the extinguishing silicon controlled rectifier 7.

Magnetically coupled to primary winding 45 of pulse transformer 44 is a secondary winding 46. Secondary winding 46 is connected across the gate-cathode electrodes of extinguishing silicon controlled rectifier 7 through respective leads 81 and 82.

The output signals of AND gate 13, which correspond to the third time period, are applied across the gate-cathode electrodes of capacitor charge circuit silicon controlled rectifier 6, power silicon controlled rectifier switch 5 and the other two inverter silicon controlled rectifiers 3 and 4 through which energizing current may be supplied to motor 16 in a second opposite direction.

Magnetically coupled to primary 55 of pulse transformer 54 are four secondary windings 56, 57, 58 and 59. Secondary winding 56 is connected across the gate-cathode electrodes of power silicon controlled rectifier switch 5 through respective leads 83 and 84, secondary winding 57 is connected across the gate-cathode electrodes of capacitor charge circuit silicon controlled rectifier 6 through respective leads 85 and 86, secondary winding 58 is connected across the gate-cathode electrodes of inverter silicon controlled rectifier 4 through respective leads 87 and 88 and secondary winding 59 is connected across the gate-cathode electrodes of inverter silicon controlled rectifier 3 through respective leads 89 and 90.

During the first time period, the output signal pulses produced by AND gate 11 produce a series of pulses through primary winding 35 of pulse transformer 34 which induce corresponding pulses in each of secondary windings 36, 37, 38, and 39, as shown in FIG. 2h. Consequently, power silicon controlled rectifier switch 5, capacitor charge circuit silicon controlled rectifier 6, inverter silicon controlled rectifier 1 and inverter silicon controlled rectifier 2, the gate-cathode electrodes of which are connected across respective secondary windings 36, 37, 38, and 39, are triggered conductive through the anode-cathode electrodes. Conducting capacitor charge circuit silicon controlled rectifier 6 completes a charge circuit for extinguishing capacitor 15 across battery 9 through inductor 18, conducting power silicon controlled rectifier switch 5 applies battery potential across the inverter silicon controlled rectifier network and conducting inverter silicon controlled rectifiers 1 and 2 supply energizing current through phase winding 17 of motor 16 in a first direction from junction 21 toward junction 22 to energize motor 16 from battery 9. Capacitor charge circuit silicon controlled rectifier 6 extinguishes when capacitor 15 has become charged with the plate thereof connected to junction 19 of being of a positive polarity with respect to the other.

During the second time period, the output signal pulses produced by AND-gate 12 produce a series of pulses through primary winding 45 of pulse transformer 44 which induce corresponding pulses in secondary winding 46, as shown in FIG. 2i. Consequently, extinguishing silicon controlled rectifier 7, the gate-cathode electrodes of which are connected across secondary winding 46, is triggered conductive through the anode-cathode electrodes. Conducting extinguishing silicon controlled rectifier 7 completes a discharge circuit for extinguishing capacitor 15 in an inverse polarity relationship across the anode-cathode electrodes of conducting power silicon controlled rectifier switch 5 to extinguish this device. With power silicon controlled rectifier 5 extinguished, the circuit to inverter silicon controlled rectifiers 1 and 2 is interrupted, consequently, these devices also extinguish.

During the third time period, the output signal pulses produced by AND-gate 13 produce a series of pulses through primary winding 55 of pulse transformer 54 which induce corresponding pulses in each of secondary windings 56, 57, 58, and 59, as shown in FIG. 2j. Consequently, power silicon controlled rectifier switch 5, capacitor charge circuit silicon controlled rectifier 6, inverter silicon controlled rectifier 4 and inverter silicon controlled rectifier 3, the gate-cathode electrodes of which are connected across respective secondary windings 56, 57, 58, and 59, are triggered conductive through the anode-cathode electrodes. Conducting capacitor charge circuit silicon controlled rectifier 6 completes a charge circuit for extinguishing capacitor 13 across battery 9 through inductor 18, conducting power silicon controlled rectifier switch 5 applies battery potential across the inverter silicon controlled rectifier network and conducting inverter silicon controlled rectifiers 3 and 4 supply energizing current through phase winding 17 of motor 16 in a second direction from junction 22 toward junction 21 to energize motor 16 from battery 9.

During the fourth time period, the output signal pulses produced by AND-gate 14 produce a series of pulses through primary winding 45 of pulse transformer 44 which induce corresponding pulses in secondary winding 46, as shown in FIG. 2i. Consequently, extinguishing silicon controlled rectifier switch 7, the gate-cathode electrodes of which are connected across secondary winding 46 is triggered conductive through the anode-cathode electrodes to extinguish conducting inverter silicon controlled rectifiers 3 and 4 in a manner previously explained.

Although specific transistor types, gate circuits and electrical polarities have been set forth in this specification, it is to be specifically understood that alternate transistor types, gate circuits and compatible electrical polarities may be employed without departing from the spirit of the invention.

While a preferred embodiment of the present invention has been shown and described, it will be obvious to those skilled in the art that various modifications and substitutions may be made without departing from the spirit of the invention which is to be limited only within the scope of the appended claims.

What is claimed is:

1. A single phase inverter control circuit comprising in combination with a single phase alternating current motor energized from a source of direct current operating potential through a single phase inverter circuit having four inverter silicon controlled rectifiers, each having gate, anode and cathode electrodes, connected in a bridge configuration a power silicon controlled rectifier switch having a gate electrode and anode-cathode electrodes connected in series between the source of direct current operating potential and the inverter circuit, a capacitor charge circuit silicon controlled rectifier having a gate electrode and anode-cathode electrodes connected in series with an extinguishing capacitor across the source of direct current operating potential and an extinguishing silicon controlled rectifier having a gate electrode and anode-cathode electrodes through which the charge upon the extinguishing capacitor may be applied across the anode-cathode electrodes of the power silicon controlled rectifier switch in an inverse polarity relationship, a source of variable frequency electrical signals, means responsive to the electrical signals produced by said source of variable frequency electrical signals for producing a discrete square wave output signal during each of four time periods, a source of constant frequency electrical signals, a gate circuit having input and output circuit means corresponding to each said time period, means for applying the electrical signals produced by said source of constant frequency electrical signals to each of said gate circuits, means for applying the said square wave during each said time period to the corresponding one of said gate circuits, means for applying the output signals from said gate circuit with corresponds to said first time period across said gate-cathode electrodes of said capacitor charge circuit silicon controlled rectifier, said power silicon controlled rectifier switch and the two said inverter silicon controlled rectifiers through which energizing current may be supplied to said motor in a first direction, means for applying the output signals from said gate circuits which correspond to said second and fourth time periods across said gate-cathode electrodes of said extinguishing silicon controlled rectifier, and means for applying the output signals from said gate circuit corresponding to said third time period across said gate-cathode electrodes of said capacitor charge circuit silicon controlled rectifier, said power silicon controlled rectifier switch and the other two said inverter silicon controlled rectifiers through which energizing current may be supplied to said motor in a second opposite direction.

2. A single phase inverter control circuit comprising in combination with a single phase alternating current motor energized from a source of direct current operating potential through a single phase inverter circuit having four inverter silicon controlled rectifiers, each having gate, anode and cathode electrodes, connected in a bridge configuration, a power silicon controlled rectifier switch having a gate electrode and anode-cathode electrodes connected in series between the source of direct current operating potential and the inverter circuit, a capacitor charge circuit silicon controlled rectifier having a gate electrode and anode-cathode electrodes connected in series with an extinguishing capacitor across the source of direct current operating potential and an extinguishing silicon controlled rectifier having a gate electrode and anode-cathode electrodes through which the charge upon the extinguishing capacitor may be applied across the anode-cathode electrodes of the power silicon controlled rectifier switch in an inverse polarity relationship, a variable frequency oscillator, means responsive to the electrical signals produced by said variable frequency oscillator for producing a discrete square wave output signal during each of four time periods, a constant frequency oscillator, a gate circuit having input and output circuit means corresponding to each said time period, means for applying the electrical signals produced by said source of constant frequency electrical signals to each of said gate circuits, means for applying the said square wave during each said time period to the corresponding one of said gate circuits, means for applying the output signals from said gate circuit which corresponds to said first time period across said gate-cathode electrodes of said capacitor charge circuit silicon controlled rectifier, said power silicon controlled rectifier switch and the two said inverter silicon controlled rectifiers through which energizing current may be supplied to said motor in a first direction, means for applying the output signals from said gate circuits which correspond to said second and fourth time periods across said gate-cathode electrodes of said extinguishing silicon controlled rectifier, and means for applying the output signals from said gate circuit corresponding to said third time period across said gate-cathode electrodes of said capacitor charge circuit silicon controlled rectifier, said power silicon controlled rectifier switch and the other two said inverter silicon controlled rectifiers through which energizing current may be supplied to said motor in a second opposite direction.

3. A single phase inverter control circuit comprising in combination with a single phase alternating current motor energized from a source of direct current operating potential through a single phase inverter circuit having four inverter silicon controlled rectifiers, each having gate, anode and cathode electrodes, connected in a bridge configuration, a power silicon controlled rectifier switch having a gate electrode and anode-cathode electrodes connected in series between the source of direct current operating potential and the inverter circuit, a capacitor charge circuit silicon controlled rectifier having a gate electrode and anode-cathode electrodes connected in series with an extinguishing capacitor across the source of direct current operating potential and an extinguishing silicon controlled rectifier having a gate electrode and anode-cathode electrodes through which the charge upon the extinguishing capacitor may be applied across the anode-cathode electrodes of the power silicon controlled rectifier switch in an inverse polarity relationship, a variable frequency oscillator, a ring counter circuit responsive to the electrical signals produced by said variable frequency oscillator for producing a discrete square wave output signal during each of four time periods, a constant frequency oscillator, a two-input NAND gate circuit corresponding to each said time period, means for applying the electrical signals produced by said constant frequency oscillator to each of said two-input NAND gate circuits, means for applying the said square wave during each said time period to the corresponding one of said two-input NAND gate circuits, means for applying the output signals from said NAND gate circuit which corresponds to said first time period across said gate-cathode electrodes of said capacitor charge circuit silicon controlled rectifier, said power silicon controlled rectifier switch and the two said inverter silicon controlled rectifiers through which energizing current may be supplied to said motor in a first direction, means for applying the output signals from said NAND gate circuits which correspond to said second and fourth time periods across said gate-cathode electrodes of said extinguishing silicon controlled rectifier, and means for applying the output signals from said NAND gate circuit corresponding to said third time period across said gate-cathode electrodes of said capacitor charge circuit silicon controlled rectifier, said power silicon controlled rectifier switch and the other two said inverter silicon controlled rectifiers through which energizing current may be supplied to said motor in a second opposite direction.

* * * * *